United States Patent [19]

Christensen et al.

[11] Patent Number: 5,750,963
[45] Date of Patent: May 12, 1998

[54] APPARATUS FOR CONTROLLING THE HEATING OF FOODSTUFFS

[75] Inventors: Keld Christensen, Fredericia; Torben Jensen, Valby, both of Denmark

[73] Assignee: Aktiebolaget Electrolux, Stockholm, Sweden

[21] Appl. No.: 553,650

[22] PCT Filed: Jun. 6, 1994

[86] PCT No.: PCT/DK94/00217

§ 371 Date: Dec. 21, 1995

§ 102(e) Date: Dec. 21, 1995

[87] PCT Pub. No.: WO94/29779

PCT Pub. Date: Dec. 22, 1994

[30] Foreign Application Priority Data

Jun. 4, 1993 [DK] Denmark ................. 0655/93

[51] Int. Cl.$^6$ .................................. H05B 1/02
[52] U.S. Cl. .................. 219/497; 219/501; 219/441; 219/508; 324/207.17; 324/223; 324/239; 324/204
[58] Field of Search .................. 219/497, 123, 219/501, 442, 443, 508, 494, 626, 627, 667; 324/240, 71.2, 207.17, 204, 207.23, 229, 232, 243, 239

[56] References Cited

U.S. PATENT DOCUMENTS

| | | | |
|---|---|---|---|
| 3,781,506 | 12/1973 | Ketchum et al. | 219/10.75 |
| 4,620,083 | 10/1986 | Andre | 219/491 |
| 4,843,319 | 6/1989 | Lara | 324/240 |
| 5,059,902 | 10/1991 | Linder | 324/207.17 |

Primary Examiner—Mark H. Paschall
Attorney, Agent, or Firm—Antonelli, Terry, Stout, & Kraus, LLP

[57] ABSTRACT

The invention is an apparatus for controlling an electrical heating element to control a cooking temperature of a cooking pot and contents therein. The invention includes a source of electrical current; a control for controlling application of electrical heating current from the source of the electrical current to the heating element to control the cooking temperature of the cooking pot and the contents which are thermally coupled to the heating element; a source of DC electrical current; a coil from producing a DC magnetic field, in response to DC electrical current applied thereto from the source of DC electrical current, which is magnetically coupled to the cooking pot and the contents therein; a switch, coupled between the source of DC electrical current and the coil, for controlling the application of DC electrical current to the coil to cause the buildup of the DC magnetic field and thereafter the decay of the DC magnetic field therein; a field sensor, magnetically coupled to the pot and the contents, for producing a control voltage which is a function of the temperature of the pot and the contents therein and which is in response to the decay of the DC magnetic field; and wherein the control is responsive to the control voltage and controls the application of the electrical heating current to the heating element as a function of a set cooking temperature inputted from a temperature control and the control voltage to cause the temperature of cooking to track the set temperature.

13 Claims, 3 Drawing Sheets

APPARATUS FOR CONTROLLING THE HEATING OF FOODSTUFFS

BACKGROUND OF THE INVENTION

1. Field of the Invention

The invention relates to an apparatus for controlling the electrical power supply to the cooking pot on a cooking device.

2. Description of the Prior Art

Constructions are known which are based on measuring the temperature of the cooking bottom by means of a sensor plate which is pressed against the bottom by means of a spring, whereupon the sensor in a way which is selected from many possibilities controls the Supply of energy until the preselected temperature has been reached, whereupon there is a switching between energy supply and disconnection in order that the temperature is kept constant. This may e.g. be in the neighborhood of the boiling point of the contents of the pot. This construction has the advantage for in particular cooking plates of the traditional type, i.e. solid and spiral, that it may be positioned in the center of the cooking plate and is hence out of the way. The disadvantage is that the temperature measured may be influenced by the cooking plate itself, but in practice there is a greater resistance to heat conduction between cooking plate and sensor than there is between the sensor and the pot bottom against which it rests through spring pressure, which all diminishes the harmful influence. For cooking plates of modern types, e.g. ceramic, halogen or induction which have a plane surface it is disadvantages that wells have to be formed into which the sensors are to be fitted, and in practice such constructions are not used with these types of cooking devices.

Furthermore components are known which in conjunction with the direct energy control constitute a model for the heat transmission between the cooking plate and the content in a pot. In its simplest form these have been known as a "Simmerstat" (reg. trade mark) which have a thermostatic wire with a well-defined heat transfer in conjunction with a knob which intermittently switches the full power on and off. However, this must be manually adjusted for each pot and cooking plate, and hence it of no consequence that the electromechanical construction has been replaced by electronic solutions.

Furthermore thermometric solutions are known in which a remote thermometer is connected to the cooking device by means of a cable for transmitting the signals from the thermometer to the electronic control unit. This provides a control of energy supply which is ideal from a temperature point of view, since it is only the thermal time constant because of the heat supply and the pot which influence the speed of control, but in practical use on a cooking device it is a construction which is not suitable. This is in particular caused by the fact that it is impossible to use a tight fitting lid, that the thermometer sensor may transfer a taste from pot to pot, and that it may be difficult to keep track of a number of remote thermometers, if there is one thermometer per cooking plate.

SUMMARY OF THE INVENTION

It is the purpose of the invention to provide a construction for control of the electric power supply to heat the contents in a pot which avoids the described disadvantages and which permits great flexibility with respect to which cooking plates are to be activated.

This is obtained in a construction according to the invention which is particular in that the measurement of the temperature is performed by creating a magnetic d.c. field in proximity to the contents of the pot, switching off the current which creates this field, and detecting temperature dependent decay of the magnetic field in a subsequent measuring period, and using the result is to control the heat energy supply to the pot in dependence of the difference between the desired temperature.

A desirable embodiment of the invention utilizes the same coil to create the magnetic field and to detect the decay of the magnetic field in a subsequent measuring phase.

A further desirable embodiment utilizes highly conductive parts of a pot such as a coil, the energy dispersion of which as a result of the decay of the magnetic field is detected by means of measuring probes placed in or below the surface of the cooking device.

A further desirable embodiment utilizes a highly conductive circuit which is put into the contents of the pot, comprising a coil and a capacitor, the resistance, capacitance, or self inductance is temperature dependent and whose energy dissipation as a result of the decay of the magnetic d.c. field is detected by means of measuring probes placed in or below the surface of the cooking device.

A desirable embodiment utilizes several steps in the temperature measuring process, in that a pot with a well-known content in a calibrating phase during performance of a standard measuring cycle gives a signature for the pot which is stored, whereupon this value is used as a correcting reference in a subsequent use of the same pot for heating pot contents.

The invention is based on the recognition that a magnetic field which has been created by means of a direct current in a stationary coil with a fixed and uniform geometry, by the removal of the current will decay as a function of those electrical currents influenced by the magnetic field. It is then of minor importance, whether it is the frequency of a damped oscillation that is detected or whether it is the time constant itself of the decay of the electrical field, the induced voltage in a stationary coil. The importance of obtaining a control signal for a power supply is that there is an influence on the decay which may be directly related to the temperature of the contents of a pot.

In the case of a damped oscillation it will in practice be a resonant circuit which has been energized by the supply of the d.c. field, it has absorbed energy which is discharged with the frequency of the resonant circuit. In the case of decay of a field it will in practical terms be the self inductance and internal resistance of the pot itself which determines the decay, and it will in that case to the largest degree be the temperature dependent specific resistance which influences the speed with which the pot discharges the stored magnetic energy. It is obvious that in case a broad frequency range is considered, there will be high frequency phenomena of short duration which are caused by the existance of capacitances in connection with the pot, but their influence is so small that they may be regarded as parasitic from a measuring point of view.

In utilizing the invention the mechanism as such for supplying energy to the contents of the pot is completely irrelevant, but it is obvious that certain advantages may be obtained in connection with intermittent connection of an energy source in that the measurement phase may suitably be synchronised with a phase during which no electrical power is supplied to the pot.

The invention will be described in detail in the following with reference to the drawing in which

DESCRIPTION OF THE PREFERRED EMBODIMENTS

Figure 1:
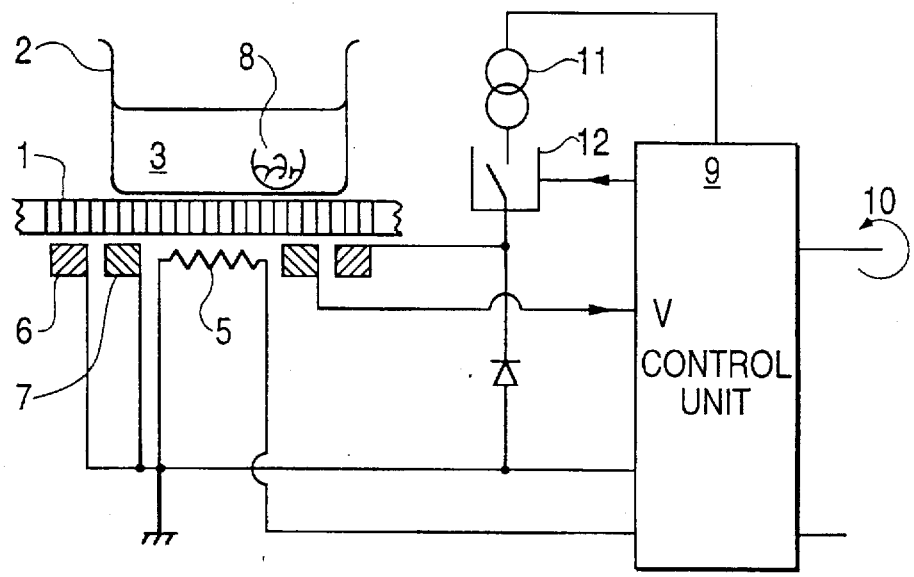
FIG. 1 shows a general arrangement with a cooling plate, a transmitting/receiving coil, and a pot, with the necessary electronics.

In FIG. 1 is shown a cooking device top plate 1, preferably of a temperature stable but non-metallic material on which is placed a pot 2 with contents 3. For clarity a heavier line indicates that the pot has a well-defined conductance, in particular near the bottom 4. Directly below the top plate there is fitted a heating element 5 which heats the pot, and with it the contents. Surrounding the heating element concentrical to the pot is fitted an outer coil 6 which may build up a magnetic field through the pot and an inner coil 7 concentric thereto which is used as a detector coil for magnetic field. In the contents of the pot is placed a rounded body 8 which contains a resonant circuit with a coil which may couple with both the stationary coils. The coils 6, 7 and the heating element 5 are coupled to a control unit 9 which generally creates an electric signal as a function of the temperature of the pot contents and controls the power supply to the heating element in dependence thereof for obtaining a temperature which is adjusted by acting on the control unit at the input 10.

The measurement procedure starts in that a current generator 11 is connected by means of a controlled switch 12 to the outer coil to which is applied a constant current until a constant magnetic field has been built up which will have occured after a number of time constants determined by the self inductances and capacitances and internal resistance in the coil and pot. Thereupon the current through the coil is switched off and after a short waiting period which allows the dispersion of high frequency phenomena the decay of the induced voltage in the detector coil 7 is measured. Instead of a direct measurement of the tile constant it may be advantageous to integrate the signal after the passage of a suitable reference level.

The arrangement shown in FIG. 1 may either be used with the mentioned rounded body or with a pot which has a well-defined conductivity, never with both parts simultaneously. In case it is the rounded body that is being measured, either the resonance frequency or the decrease of the oscillation may be measured.

It is advantageous to use only one coil for both the building up of a field and for the measurement of the field, in that it is only required that proper timing of the connections to the control unit is made.

Figure 2:
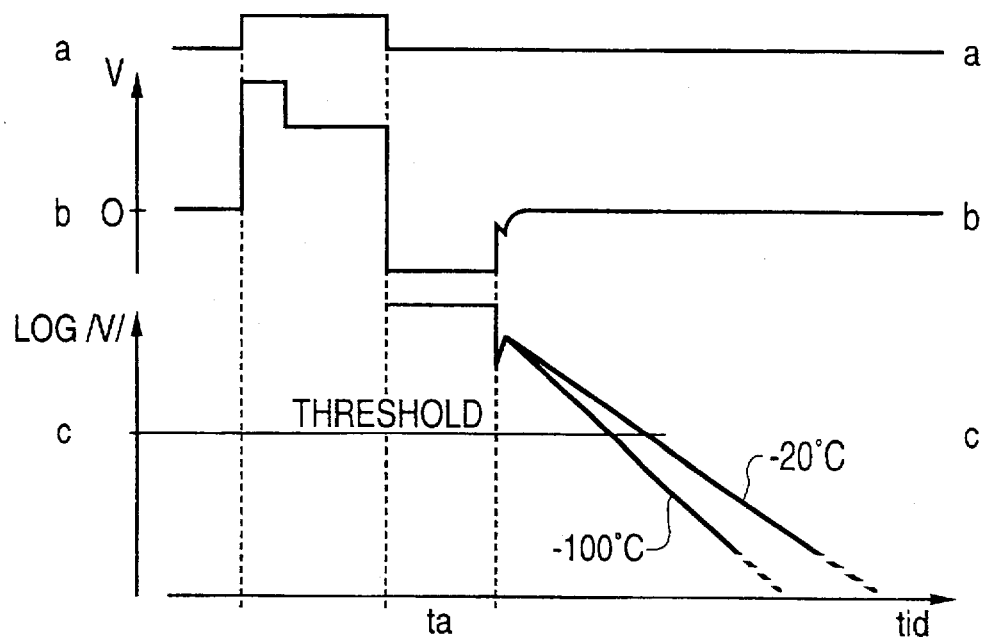
FIG. 2 shows functions for the decay of the magnetic field which is briefly stored by pot parts.

In FIG. 2 the basic function of the decay of a magnetic field in a measuring phase after a charging phase is shown. At a) is shown the period in which the switch connects the coil to the current source, and at b) the resulting voltage V across the coil 7. After a time ta which is used for active break-down of the field contribution from the coil (either by means of a controlled current through the coil 6 or by means of a controlled current in connection with switching a single coil from building-up to measurement) it will be seen that the induced voltage in the coil from the negative value rises towards 0 with a particular time constant. In that the voltages vary over a very large interval it is advantageous to display the function in a logarithmic scale as at c) where it is also seen that the exponential decay becomes rectilinear. Functions for the temperatures ca. 20 degrees Celsius and ca. 100 degrees Celsius are shown, and it is seen that the voltage decays faster because of the higher resistance at 100 degrees. A lower resistance would allow the current in the pot to run for longer time.

Various factors influence the precision of the energy control: The time that the magnetic field has been supplied to the pot and its value, the speed with which the magnetic field is actively broken down, the placement of the pot with respect to the coil, and obviously interference noise and thermic noise. All these factors show that the most certain measurements would be obtained by integration and by letting the integration periods be equal to a complete period of the electrical power company frequency whereby the noise which is synchronous with the electrical power company frequency is eliminated. It is obvious that modern digital signal processing enables an efficient control of the power with corrections for the various outer influences without the various tricks which are shown here in connection with an analogue signal processing. In the digital signal processing it is important that the window is placed correctly in relation to noise pulses and that the sampling frequency is sufficiently high that the high frequency processes may be eliminated actively and not only by filtering in the anti-aliasing filters.

Figure 3:
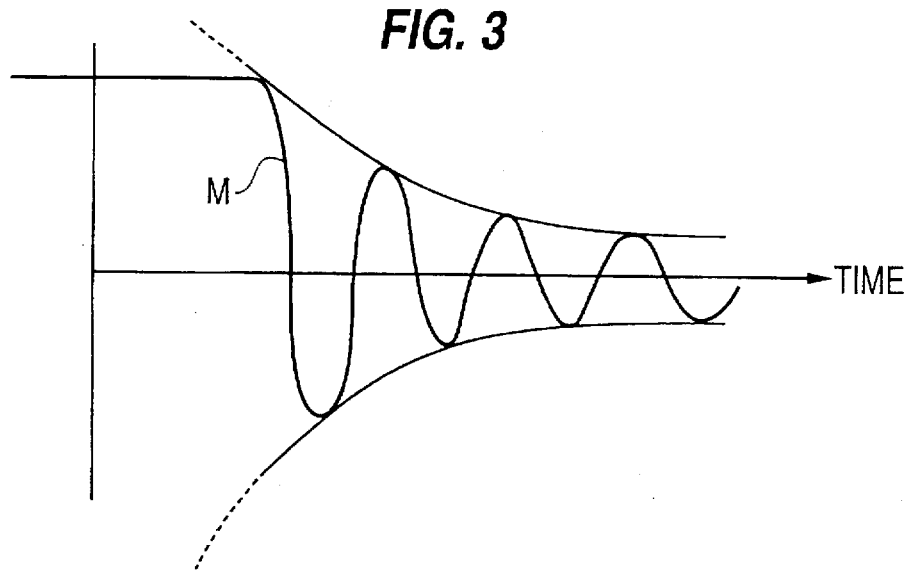
FIG. 3 shows functions for the decay of the magnetic field which is briefly stored by a temperature sensitive unit placed in the contents of the pot.

In FIG. 3 is shown the basic function of the oscillation which is obtained when the magnetic field decays when the resonant circuit in the rounded body is used. A measurement of the peak values as a function of time gives the logarithmic decrease and hence the time constant for the decay of the field.

Figure 4A:
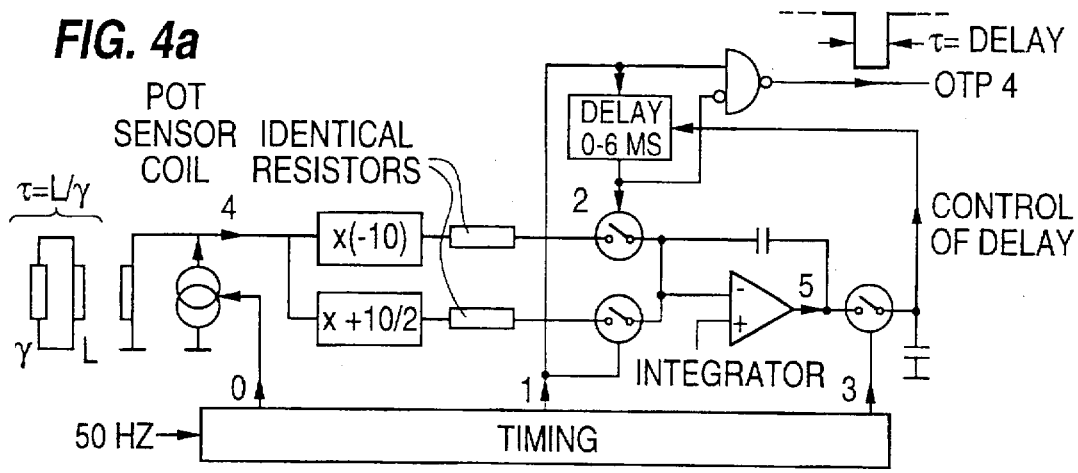
FIG. 4 shows a schematic construction for the measurement of the time constant for decay.
Figure 4B:
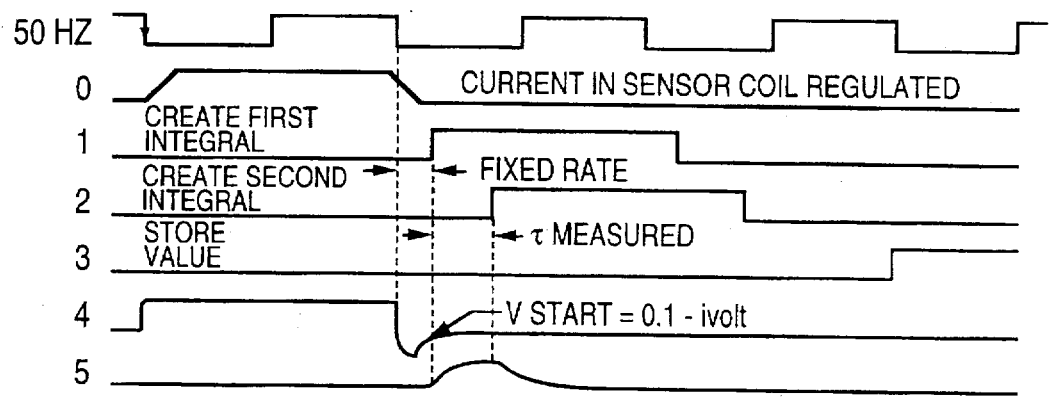
Figure 4C:
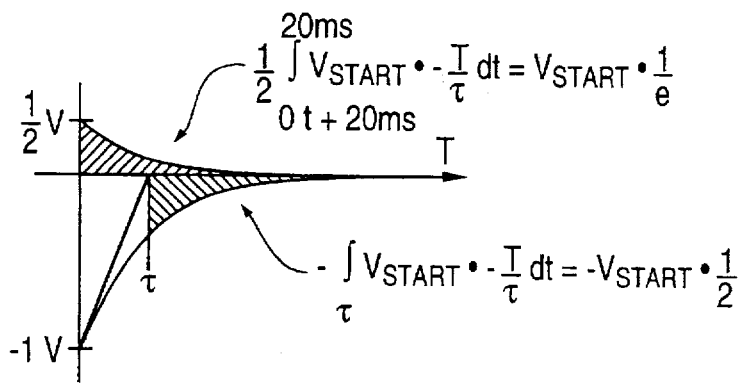

In FIG. 4 is shown a circuit for the measurement of the time constant using double integration in an iterative process. The measurement is based on the observation that if the proportion between the integrals is precisely e (the base of natural logarithms) the time shift between the start times of the integrations will be precisely equal to the desired time constant. At the measurement points indicated by the numbers 0 to 5 in FIG. 4a) the voltages will be as shown at FIG. 4b). At FIG. 4c) it is shown FIG. 1c how the self-compensating value for the time constant is obtained from the integrals used. The time delay which which is equal to the time constant is obtaind after adjustment of the DELAY-unit shown after performance of a number of integration cycles which only stops when the difference between the integrals is equal to zero.

Figure 5:
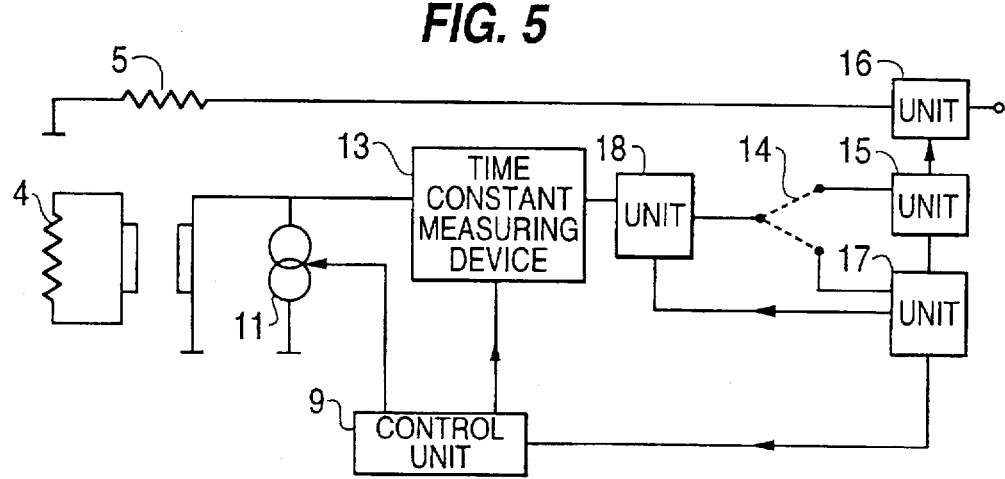
FIG. 5 is a schematic representation of the performance during self-calibration.

In FIG. 5 is shown how it is possible to let the cooking device detect which pot out of a number of possible pots is in actual use, in order to obtain a link between the measurements of time constants and the contents temperature they represent. This requires storing a characteristic for each pot. Thereby the apparatus itself will ensure correct control of the power in order to obtain a given chosen temperature for the contents of a pot. The measurement proper of the time constant is performed in the time constant measuring device 13 which is controlled by the control unit 9 as is the current generator 11. The measured time constant is used during ordinary running for controlling the power supply by means of the units 15 and 16 because a switch 14 is placed in the ordinary position. In case the switch is connected to the unit 17 this logs calibration data which are composed of data for a time constant and data from the unit 15 which report the supply of power. These data are used for modifying control data from the unit 13 in the unit 18 each time the power for the recognized pot is to be controlled during ordinary running. In case a control function from the control unit 9 is established to the switch 14 a checking measurement may be performed repeated times of the pot in use during the preparation of food.

In the embodiment shown it is as a minimum required that an empty pot has been put on the cooking device at room temperature which gives one point on a characteristic.

If one may presume that the user will accept that the calibration phase must be performed with a certain care, a practical process will be to put the given pot with a content of water on the apparatus and perform a boiling by supplying power until the temperature and hence the measured time constant has reached a constant value. With knowledge of the power supplied it is possible to obtain and to store a calibration curve. Such a function is used in a digital implementation of the apparatus. However, it may also be possible to utilize some of the phenomena of higher frequency which consequently are of shorter duration for characterization but the chosen method will be dependent on a skilled balancing of the increased requirement for data collection and digital signal processing.

It is obvious that the illustrated embodiment represents only one of the many possible methods. Hence there are different requirements for user participation. On may e.g. require of a user that a button marked "new pot" be pushed, as it must be considered reasonable to have a "reset" button in case the owner of a set of pots, the characteristics of which have.been stored should move from the coking device, taking the pots away.

We claim:

1. An apparatus for controlling an electrical heating element to control a cooking temperature of a cooking pot and contents therein comprising:

a source of electrical current;

a control for controlling application of electrical heating current from the source of the electrical current to the heating element to control the cooking temperature of the cooking pot and the contents which are thermally coupled to the heating element;

a source of DC electrical current;

a coil for producing a DC magnetic field, in response to DC electrical current applied thereto from the source of DC electrical current, which is magnetically coupled to the cooking pot and the contents therein;

a switch, coupled between the source of DC electrical current and the coil, for controlling the application of DC electrical current to the coil to cause the buildup of the DC magnetic field and thereafter the decay of the DC magnetic field therein;

a resonant circuit, magnetically coupled to the decay of the DC magnetic field, which electrically resonates in response to the decay of the DC magnetic field in the coil;

a field sensor, magnetically coupled to the resonant circuit, for detecting decay of electrical oscillation in the resonant circuit, the sensor producing a control voltage which is a function of the temperature of the pot and the contents therein; and wherein the control is responsive to the control voltage and controls the application of the electrical heating current to the heating element as a function of a set cooking temperature inputted from a temperature control and the control voltage to cause the temperature of cooking to track the set temperature.

2. An apparatus in accordance with claim 1 wherein:
   the field sensor comprises another coil.

3. An apparatus in accordance with claim 1 wherein:
   the field sensor comprises the coil.

4. An apparatus in accordance with claim 1 wherein:
   the resonant circuit is placed in the pot along with the contents during cooking and an electrical parameter which is one of resistance, capacitance or inductance of the resonant circuit changes with increasing cooking temperature.

5. An apparatus in accordance with claim 2 wherein:
   the resonant circuit is placed in the pot along with the contents during cooking and an electrical parameter which is one of resistance, capacitance or inductance of the resonant circuit changes with increasing cooking temperature.

6. An apparatus in accordance with claim 3 wherein:
   the resonant circuit is placed in the pot along with the contents during cooking and an electrical parameter which is one of resistance, capacitance or inductance of the resonant circuit changes with increasing cooking temperature.

7. An apparatus in accordance with claim 1 wherein:
   the control is calibrated with a standard temperature measurement using the pot which calibration is used by the control during subsequent cooking of the contents.

8. An apparatus in accordance with claim 2 wherein:
   the control is calibrated with a standard temperature measurement using the pot which calibration is used by the control during subsequent cooking of the contents.

9. An apparatus in accordance with claim 2 wherein:
   the control is calibrated with a standard temperature measurement using the pot which calibration is used by the control during subsequent cooking of the contents.

10. An apparatus in accordance with claim 7 wherein:
    the field sensor comprises another coil.

11. An apparatus in accordance with claim 10 wherein:
    the pot functions as an electrically conductive coil which is magnetically coupled to the coil for producing the DC magnetic field and to the field sensor.

12. An apparatus in accordance with claim 10 wherein:
    the control is calibrated with a standard temperature measurement using the pot which calibration is used by the control during subsequent cooking of the contents.

13. An apparatus in accordance with claim 11 wherein:
    the control is calibrated with a standard temperature measurement using the pot which calibration is used by the control during subsequent cooking of the contents.

* * * * *